Nov. 10, 1959 G. N. SANDOR 2,912,058
ADJUSTABLE SPEED LIMITER SYSTEM FOR MOTOR VEHICLES
Filed Oct. 21, 1957 4 Sheets-Sheet 1

INVENTOR.
GEORGE N. SANDOR.
BY
ATTORNEY

Nov. 10, 1959   G. N. SANDOR   2,912,058
ADJUSTABLE SPEED LIMITER SYSTEM FOR MOTOR VEHICLES
Filed Oct. 21, 1957   4 Sheets-Sheet 2
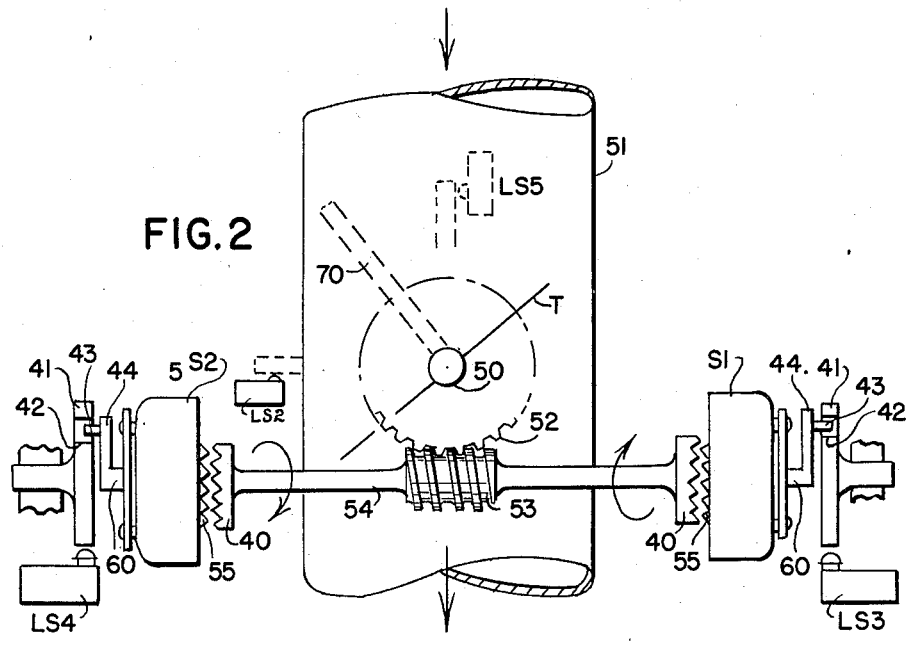
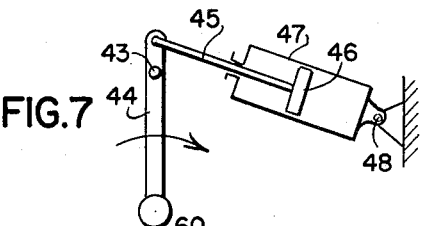
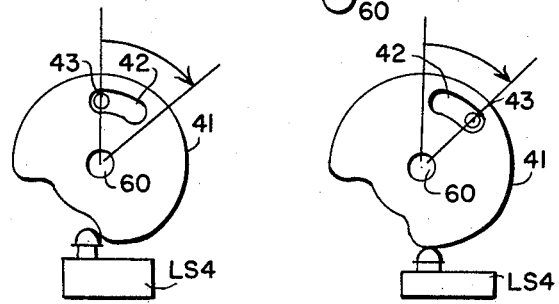
FIG.3   FIG.4
INVENTOR.
George N. Sandor
BY
ATTORNEY Nov. 10, 1959 G. N. SANDOR 2,912,058
ADJUSTABLE SPEED LIMITER SYSTEM FOR MOTOR VEHICLES
Filed Oct. 21, 1957 4 Sheets-Sheet 4

INVENTOR.
George N. Sandor
BY
ATTORNEY

United States Patent Office 2,912,058
Patented Nov. 10, 1959

2,912,058

ADJUSTABLE SPEED LIMITER SYSTEM FOR MOTOR VEHICLES

George N. Sandor, Mamaroneck, N.Y., assignor to Eugenia N. Sandor, Mamaroneck, N.Y.

Application October 21, 1957, Serial No. 691,283

15 Claims. (Cl. 180—82.1)

This invention relates to an electrically operated speed limiting system, for use in a vehicle propelled by a motor having a power adjusting member, the vehicle having a speedometer cable, which system will automatically prevent the vehicle from exceeding a maximum speed selected by the driver, subject to the quick temporary release by the driver of such restraint when a greater speed is needed.

The invention comprises, essentially, a small governor generator driven from the shaft of the speedometer cable, generating a voltage approximately in proportion to the speed of the vehicle, which is impressed upon a control system characterized by a master relay and a supplemental relay, the said system being adjusted by hand-setting a potentiometer to the maximum speed selected, to react when the voltage generated by the governor generator reaches that corresponding to the pre-set speed limit, causing the alternate energizing of two solenoids or other electric actuating means by power drawn from the vehicle's conventional electric power system, and their respective operation, through mechanical means, to regulate the power supply to the motor.

The said system includes means to temporarily release the speed limitation imposed by the system when a greater speed is required.

The advantages of said system are that power is drawn from the electrical power system of the vehicle only when momentarily needed to change the position of the power regulating means; that it imposes no limitation upon the engine speed until the vehicle speed reaches the preset limit; that the releasing means are quickly applied and continue only for an adjustable predetermined time interval, and that the power regulation is applied in stages at predetermined time intervals which avoids "hunting."

In the drawings:

Fig. 2 is an elevation of a throttle adjusting mechanism.

Fig. 3 is a view of the cam attached to the solenoid and the associated limit switch at the beginning of the forward stroke of the rotor of the throttle closing solenoid.

Fig. 4 is a view of the same cam and switch at the completion of the forward stroke of the rotor.

Fig. 7 is a schematic view of a damping means.

Figure 1:
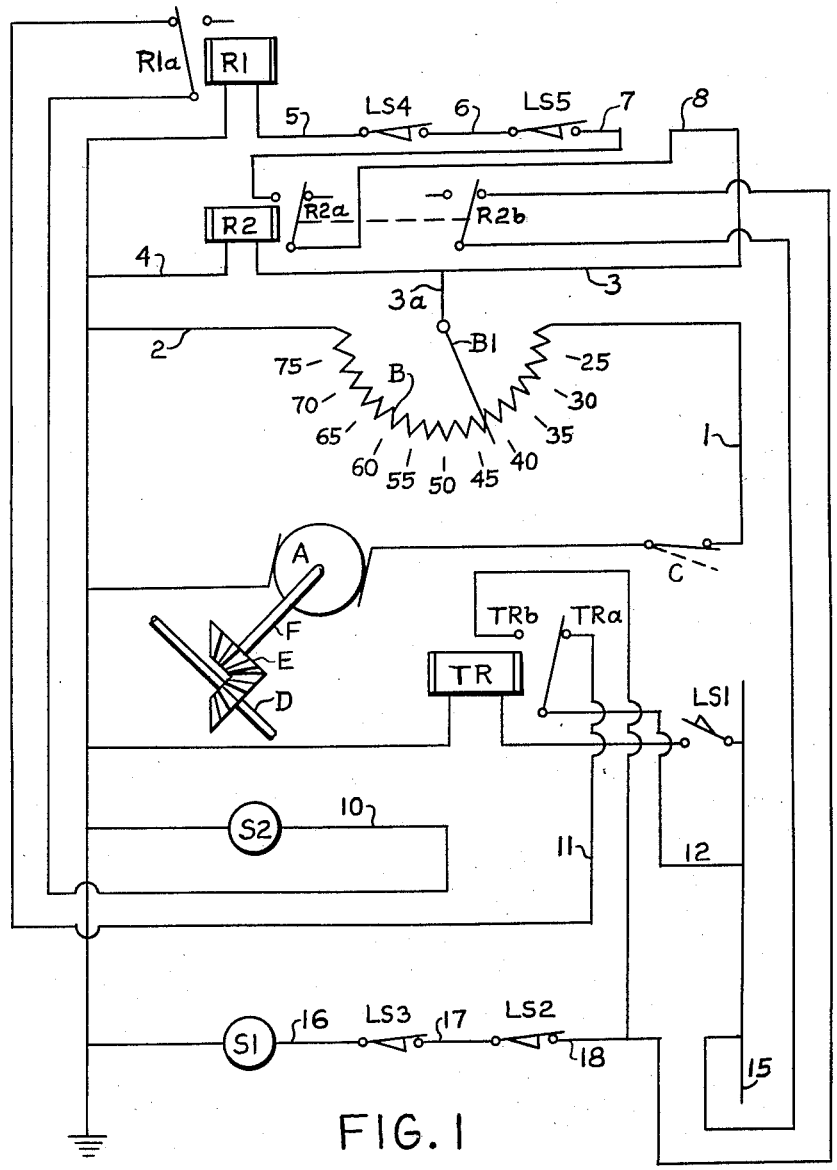
Fig. 1 is a schematic diagram of a system embodying this invention.

Referring to the drawings:

A small governor generator A is driven by the conventional speedometer cable D through bevel gears E and rotor shaft F, generating a voltage approximately proportional to the speed of the vehicle.

The full governor generator voltage is permanently connected across the terminals of a potentiometer B mounted on the dashboard of the vehicle, on one side connected to governor generator A by line 1 containing an off-on switch C mounted on the dashboard, and on the other side to ground by line 2. Potentiometer B is provided with a scale calibrated in miles per hour and suitable means for adjusting arm $B^1$.

Figure 5:
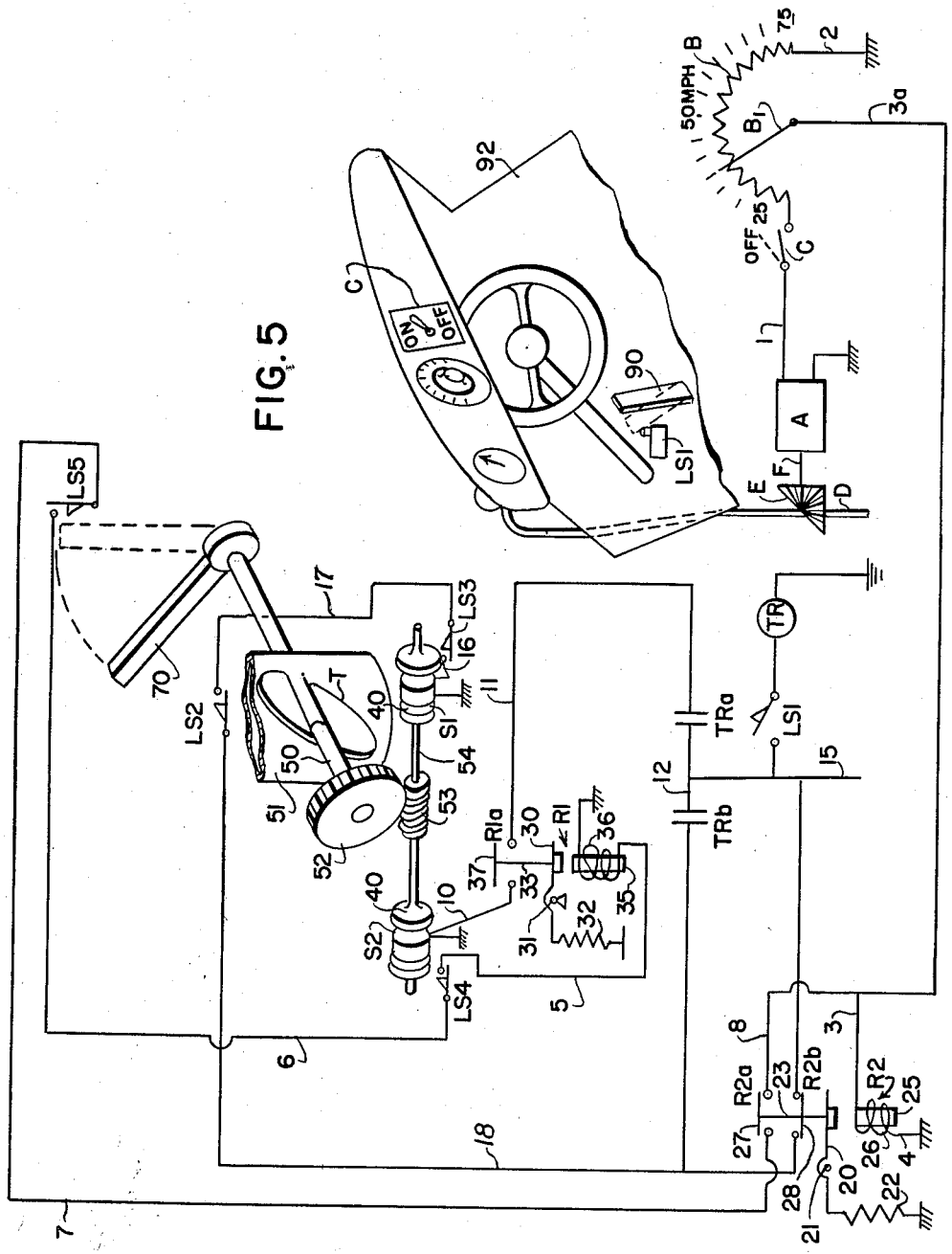
Fig. 5 is a schematic, diagrammatic view of the system.

Electro-magnetic relay R2 contains normally open contacts R2a and normally closed contacts R2b which are simultaneously operated by armature 20 of the relay. As employed herein, the terms "R2a," "R2b" and "R1a," each include a conductor bar and the contact terminals. As shown in Fig. 5, armature 20 is pivoted at 21, spring 22 normally keeping it out of contact with core 25 of the relay R2. The conductor bars 27 and 28 of contacts R2a and R2b are carried by rod 23 secured to the free end of armature 20. The tension of spring 22 is such that relay R2 will react to that voltage which the governor generator generates at the lowest vehicle speed designated on the potentiometer scale.

Coil 26 of relay R2 is connected on one side by lines 3, 3a, to arm $B^1$ of potentiometer B, and on the other side to ground by line 4.

A second relay R1 (Fig. 5) contains normally open contact R1a actuated by armature 30 of relay R1 which is pivotally mounted at 31, spring 32 normally keeping it out of contact with core 35, conductor bar 37 of contacts R1a being carried by rod 33 secured to the armature. The tension of spring 32 is such that relay R1 is responsive to the same voltage to which relay R2 is responsive.

Coil 36 of relay R1 is connectable on one side to coil 26 of relay R2 by line 5, normally closed limit switch LS4, line 6, normally closed limit switch LS5, line 7, normally open contacts R2a, line 8 and line 3.

At this point it will be understood that armature 20 of relay R2 is tripped only when the voltage generated by governor generator A equals or exceeds the voltage corresponding to the speed at which arm $B^1$ has been preset, and that relay R1 is only energized when voltage is communicated to it through relay R2.

Solenoids S1 and S2 employed in the system are rotary type solenoids, presently available, in which the rotors 55 move endwise, in screw fashion, as they turn, engaging an end engagement ratchet 40, with which they are furnished as standard equipment. When the solenoid is energized, rotor 55 moves forward and engages end engagement ratchet 40 and turns it one segment, making a stroke of about 25 degrees. If equipped with cam 41 and a limit switch such as LS4 (Figs. 2, 3, 4), the rotor will be returned by the spring action forming part of the standard solenoid unit. As so equipped, this return is successively followed by a second forward stroke and a spring returned stroke, and such strokes continue so long as energizing current is maintained. In case the action of the solenoid is too fast causing the system to "hunt," suitable damping means can be installed to slow the movement of the solenoid, such as the form shown in Fig. 7 or in Fig. 8.

Solenoid S2 is connected by line 10, normally open contacts R1a, line 11, the normally closed contacts TRa of the time delay relay TR and line 12 to hot line 15 of the electric power system of the vehicle, and on the other side to ground.

The right side of solenoid S1 is connected by line 16, normally closed limit switch LS3, line 17 and normally closed limit switch LS2 to line 18 which is connected to hot line 15 of the vehicle's electric power system by normally closed contacts R2b and the normally open contacts TRb of time delay relay TR, associated with line 11 in parallel relationship, and the other side of solenoid S1 is grounded. The normally open limit switch LS1 is connected in series with the coil TR of the time delay relay, and energizes it from hot line 15 when closed.

In the embodiment shown in Figs. 2 and 5, a supplemental throttle T is introduced in the intake 51 of the carburetor in addition to the regular throttle.

Shaft 50 of throttle T extends through and protrudes from the walls of intake 51 and a worm gear 52 is mounted at one end of the shaft.

As shown in Fig. 2, worm gear 52 engages worm 53 on shaft 54 which at each end thereof is provided with an end engagement ratchet 40 for engagement by rotors 55 of solenoids S1 and S2. A cam 41 is mounted outside of and in alignment with each solenoid, S1, S2, provided with a slot 42 (Fig. 3) which is engaged by a projecting pin 43 carried by arm 44 mounted on the rotor shaft 60 of the solenoid. Limit switch LS4 is mounted in the path of movement of cam 41, and a like limit switch LS3 is mounted, for association with solenoid S1, in the path of movement of its cam 41. Both limit switches LS3 and LS4 are normally closed.

When solenoid S2 is energized, it performs a clockwise stroke as viewed in Fig. 3. Near the end of this stroke, pin 43 reaches the end of slot 42 in cam 41, which cam then actuates limit switch LS4, thereby de-energizing relay R1 causing contacts R1a to open. This de-energizes solenoid S2 which now performs a spring returned stroke at the end of which pin 43 moves cam 41 to re-close limit switch LS4, again energizing relay R1.

If the vehicle has not yet slowed down below the pre-set speed limit, contacts R1a will again be closed by relay R1 and solenoid S2 again energized and throttle T will be further closed by forward successive strokes of the rotor of solenoid S2, segment by segment, until the vehicle has slowed to the speed limit, after which the throttle will remain in the partially closed position.

The operation of cams 41 by their respective solenoids S1, S2, is the same.

When the vehicle slows down to a speed below the pre-set speed limit, relay R2 drops out since the lower voltage is not sufficient to keep it tripped. Contacts R2b thereupon close and thus cause solenoid S1 to be energized by the electric power system of the vehicle, whereupon the rotor of solenoid S1 rotates cam 41 stroke by stroke, opening and closing limit switch LS3 in the same manner as described in the operation of the cam of solenoid S2, until throttle T is fully opened.

An arm 70 is mounted on shaft 50 of throttle T which actuates limit switches LS2 and LS5, each of which is normally closed, and is placed in the path of movement of arm 70.

The opening of limit switch LS2 disconnects solenoid S1 from hot line 15 of the electric power system of the vehicle, and prevents any further throttle opening strokes by solenoid S1, and the opening of limit switch LS5 de-energizes relay R1 and hence solenoid S2, preventing any further throttle closing strokes by the latter.

Figure 6:
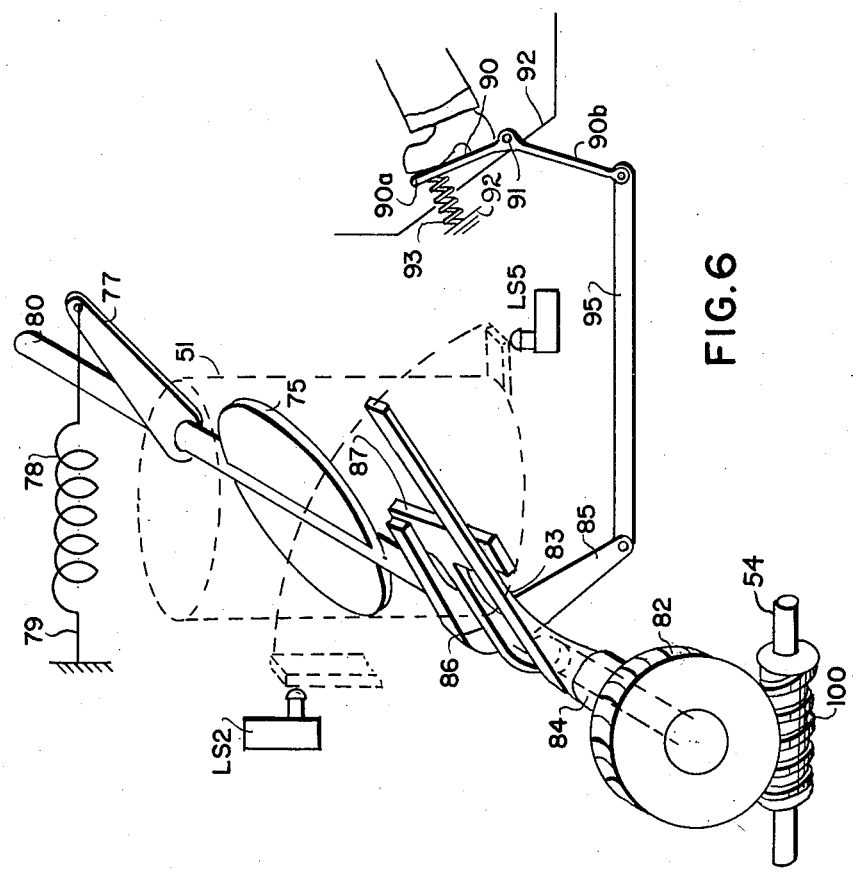
Fig. 6 is an isometric view, partly diagrammatic, of another form of throttle control.

The modified form of throttle control shown in Fig. 6 dispenses with a supplemental throttle and applies the control mechanism to the regular throttle 75 in the intake of the carburetor.

As shown in Fig. 6, shaft 80 of throttle 75 extends through and protrudes from the walls of intake 51 of the carburetor.

Worm gear 82 and arm 83 are fixedly mounted upon a common sleeve 84 which is freely mounted on shaft 80 at its near end as seen in Fig. 6, worm gear 82 being outwardly spaced on the sleeve from arm 83. Bell crank 85 is freely mounted on shaft 80 in spaced relation to arm 83. Between arm 83 and bell crank 85, arm 86 having an upper transverse bar 87 is keyed to shaft 80 at a position thereon where bar 87 will be in the path of movement of arm 83 and the upper arm of bell crank 85. Limit switches LS2 and LS5 are placed in the path of movement of arm 83 which is extended sufficiently to engage them.

Arm 77 is fixedly mounted on the portion of shaft 80 protruding from the far side of intake 51 as seen in Fig. 6, one end of tension spring 78 being secured to the end of arm 77 and the other end 79 being anchored, tending to open throttle 75.

Accelerator pedal 90 comprises a lever fulcrumed at 91 and pivotally mounted on floor 92 of the vehicle. Compression spring 93 is secured to floor 92 and to the underside of upper arm 90a of pedal 90. The end of lower arm 90b is pivotally connected to one end of link 95, the other end of which is pivotally connected to the end of the lower arm of bell crank 85.

Compression spring 93 is substantially stronger than tension spring 78, and tends to lift the free end of arm 90a of the pedal, thereby causing bell crank 85 to move clockwise.

The position of throttle 75 and of the members of the controlling mechanism shown in Fig. 6 illustrates one which ordinarily would occur while the speed limiting system is in operation, throttle 75 having been closed to the extent shown by the turning of worm 100 by rotor 55 of solenoid S2 and the consequent rotation of worm gear 82 and arm 83 to the position of the latter shown.

The depression of accelerator pedal 90 will cause bell crank 85 to move counterclockwise, but throttle 75 cannot follow it under the tension of spring 78 since cross-bar 87 of arm 86 is blocked by arm 83, and hence the depression of pedal 90 has no effect on throttle 75.

Owing to the self-locking nature of the right-hand worm-and-gear set consisting of worm 100 and worm gear 82, arm 83 can be turned counterclockwise only by turning worm 100 clockwise as viewed from the right in Fig. 6, which can only be accomplished by de-energizing solenoid S2 and energizing solenoid S1.

During the operation of the vehicle with the speed limiting system in operation, when the speed of the vehicle is reduced below the pre-set speed by approximately 2 or 3 miles per hour, solenoid S2 is de-energized and solenoid S1 is energized resulting in the turning of arm 83 counterclockwise permitting the opening of the throttle if necessary, as hereinbefore described in connection with the construction shown in Figs. 2 and 5, and no change in those respects is introduced by the construction shown in Fig. 6.

Upon turning dashboard switch C to an "off" position, if arm 83 is then in a closing position, it is immediately moved to an open position. This is brought about by relay R2 being de-energized by turning off switch C, thereby simultaneously opening contacts R2a and closing contacts R2b, the latter then connecting solenoid S1 with hot line 15 of the vehicle's electric power system, causing its rotor 55 to turn worm 100, which turns worm gear 82 and arm 83 in a throttle opening direction until arm 83 assumes a position corresponding to a fully open throttle position, throttle 75 following arm 83 under tension of spring 78 if and when the accelerator is depressed, and to the extent permitted by upper arm of bell crank 85, the latter being under the control of the driver by way of the accelerator, until throttle 75 is fully opened.

When arm 83 reaches the fully opened throttle position, it engages and opens limit switch LS2 thereby disconnecting solenoid S1 from hot line 15 of the vehicle's electric power system, de-energizing solenoid S1 and disengaging its rotor 55 from ratchet 40 on worm shaft 54.

The restraint of the system may be released, temporarily, when for instance, the driver desires a sudden spurt of speed to pass another vehicle, by depressing the accelerator pedal to the floor of the vehicle, thereby actuating limit switch LS1, which is mounted in the path of movement of the accelerator pedal.

Upon actuation, limit switch LS1 energizes time delay relay TR which opens contacts TRa and closes contacts TRb for a predetermined interval, thereby disconnecting solenoid S2 from hot line 15 of the vehicle's electric power system, thereby de-energizing it, and simultaneously connecting solenoid S1 to hot line 15, thereby energizing it by power drawn from the vehicle's electric power system. Solenoid S1 through the speed control mechanism shown in Figs. 2 and 5 and the modified form shown in Fig. 6 will cause supplemental throttle T of the construction shown in Figs. 2 and 5, or the regular throttle 75 of the construction shown in Fig. 6, to be moved to a fully opened position.

Upon release of the accelerator pedal 90, and after the said interval, the system will be restored to operative condition as hereinbefore described.

The damping means shown in Fig. 7 is a conventional dashpot consisting of cylinder 47 pivotally anchored at 48, piston 46 and piston rod 45, the latter being pivotally connected to an extension of arm 44.

Figure 8:
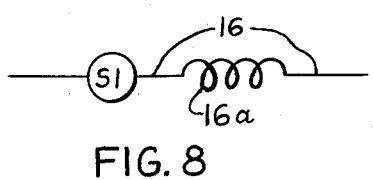
Fig. 8 is a diagram of an electric damping means.

The electric damping means exemplified in Fig. 8 consists of an induction coil 16a introduced in line 16 and will delay the functioning of solenoid S1 upon energization. Similar electric damping means can be introduced in conjunction with solenoid S2.

The particular embodiments shown and described herein have been chosen as examples to point out clearly the operating principles and features of my improved adjustable speed limiting system, both applied to vehicles impelled by internal combustion motors, and it is not intended to limit the scope of my invention to such particular embodiments or to such applications.

I claim:

1. An adjustable speed limiting system for use with a vehicle propelled by a motor having a power adjusting member, said vehicle having a speedometer cable, comprising a generator driven from the speedometer cable for generating a voltage substantially proportional to the speed of the vehicle, electro-magnetic relay operable by the generator for actuating a second electro-magnetic relay when the voltage output of the generator reaches or exceeds a predetermined value and for de-actuating said second electro-magnetic relay when said voltage output falls below said predetermined value, variable resistance means for varying the power supply from the generator to said first named electro-magnetic relay to provide for actuation of said first electro-magnetic relay at any predetermined vehicle speed, a normally open circuit including an electric actuating means and a source of energy independent of the voltage output of the generator, said second electro-magnetic relay completing said circuit upon its actuation by said first electro-magnetic relay to thereby energize said electric actuating means by said independent source of energy, a second circuit including said independent source of energy and a second electric actuating means, open while said first named circuit is closed, means operable by the generator for completing said second circuit simultaneously with the de-actuation of said second electro-magnetic relay when the voltage output of the generator falls below said predetermined value, to thereby energize said second electric actuating means by said independent source of energy, regulating means for changing the propelling power of the vehicle as adjusted by the power adjusting member, means operable by said first electric actuating means for moving said regulating means in the direction of reducing said power, like means operable by said second electric actuating means for moving said regulating means in the direction of increasing said vehicle power, means operable by each said moving means for intermittently interrupting and restoring its moving action comprising a member opening and closing a circuit breaking means to de-energize and energize the first and second electric actuating means, respectively, means operable by said regulating means for de-energizing said second electric actuating means when said regulating means has reached a position corresponding to maximum power adjustment, and means operable by said regulating means for de-energizing said first electric actuating means when said regulating means has reached a position corresponding to minimum power adjustment.

2. An adjustable speed limiting system for use with a vehicle propelled by a motor having a power adjusting member, said vehicle having a speedometer cable, comprising a generator driven from the speedometer cable for generating a voltage substantially proportional to the speed of the vehicle, relay means operable by the generator for actuating a second relay means when the voltage output of the generator reaches or exceeds a predetermined value and for de-actuating said second relay means when said voltage output falls below said predetermined value, variable resistance means for varying the power supply from the generator to said first named relay means to provide for actuation of said first relay means at any predetermined vehicle speed, a normally open circuit including an electric actuating means and a source of energy independent of the voltage output of the generator, said second relay means completing said circuit upon its actuation by said first relay means to thereby energize said electric actuating means by said independent source of energy, a second circuit including said independent source of energy and a second electric actuating means, open while said first named circuit is closed, means operable by the generator for completing said second circuit simultaneously with the de-actuation of said second relay means when the voltage output of the generator falls below said predetermined value, to thereby energize said second electric actuating means by said independent source of energy, a supplemental power adjusting member, regulating means for moving said supplemental power adjusting member into positions corresponding to power reduction or increase, means operable by said first electric actuating means when energized for causing said regulating means to move said supplemental power adjusting member in a direction of reduction of power, like means operable by said second electric actuating means when energized for causing said regulating means to move said supplemental power adjusting member in a direction of increase of power, means operable by each said electric actuating means for intermittently interrupting and restoring its actuating action, means operable by said regulating means for de-energizing said first electric actuating means when said supplemental power adjusting member reaches a position of minimum power, means operable by said regulating means for de-energizing said second electric actuating means when said supplemental power adjusting member reaches a position of maximum power, and means operable by the depression of the accelerator of the vehicle for simultaneously de-energizing said first electric actuating means and energizing said second electric actuating means to temporarily cause said supplemental power adjusting member to move to a position of maximum power.

3. A combination according to claim 2, wherein said first and second circuits each includes a time delay element.

4. A combination according to claim 2 wherein means are included for damping said means operable by said first electric actuating means when energized for causing said regulating means to move said supplemental power adjusting member in a direction of reduction of power, and also for damping said like means operable by said second electric actuating member when energized for causing said regulating means to move said supplemental power adjusting member in a direction of increase of power.

5. A combination according to claim 2 wherein said means operable by the depression of the accelerator of the vehicle for simultaneously de-energizing said first electric actuating means and energizing said second electric actuating means to temporarily cause said supplemental power adjusting member to move to a position of maximum power, includes a time delay element.

6. An adjustable speed limiting system for use with a vehicle propelled by a motor having a power adjusting member, said vehicle having a speedometer cable, comprising a generator driven from the speedometer cable for generating a voltage substantially proportional to the speed of the vehicle, relay means operable by the generator for actuating a second relay means when the voltage output of the generator reaches or exceeds a predetermined value and for de-actuating said second relay means when the voltage output falls below said predetermined value, variable resistance means for varying the power supply from the generator to said first named relay means to provide for actuation of said first relay means at any predetermined vehicle speed, a normally open circuit including a solenoid and a source of energy independent of the voltage output of the generator, said second relay means completing said circuit upon its actuation by said first relay means to thereby energize said solenoid by said independent source of energy, a second circuit including said independent source of energy and a second solenoid open while said first named circuit is closed, means operable by the generator for completing said second circuit simultaneously with the de-actuation of said second relay means when the voltage output of the generator falls below said predetermined value, to thereby energize said second solenoid by said independent source of energy, each said solenoid having a rotor, means for helically moving said rotor forwardly upon energization of the solenoid and means returning the rotor upon de-energization of the solenoid, a supplemental power adjusting member mounted in the air-intake of the carburetor of the vehicle, a worm and a worm gear engaging said worm, means co-acting with said worm gear for moving said supplemental power adjusting member upon rotation of said worm gear, a pair of ratchets respectively operatively connected with the ends of said worm in opposed relationship, means carried by the rotor of the first solenoid for engaging one of said ratchets for turning said worm in a direction to cause said supplemental power adjusting member to assume a power reducing position, like means carried by the rotor of the second solenoid for engaging the other of said ratchets for turning said worm in the opposite direction, means operable by each said rotor, respectively, for intermittently de-energizing and energizing its solenoid, means operable by said worm gear for deenergizing said first solenoid when said supplemental power adjusting member reaches a position corresponding to minimum power and like means operable by said worm gear for de-energizing said second solenoid when said supplemental power adjusting member reaches a position corresponding to maximum power, and means operable by the depression of the accelerator of the vehicle for simultaneously de-energizing said first solenoid and energizing said second solenoid to temporarily cause said supplemental power adjusting member to move to a position corresponding to maximum power.

7. A combination according to claim 6, wherein said first and second circuits each includes a time delay element.

8. A combination according to claim 6 wherein means are included for damping said means carried by the rotor of the first solenoid for engaging one of said ratchets for turning said worm in a direction to cause said supplemental power adjusting member to assume a power reducing position, and also for damping said like means carried by the rotor of the second solenoid for engaging the other of said ratchets for turning said worm in the opposite direction.

9. A combination according to claim 6 wherein said means operable by the depression of the accelerator of the vehicle for simultaneously de-energizing said first solenoid and energizing said second solenoid to temporarily cause said supplemental power adjusting member to move to a position of maximum power, includes a time delay element.

10. An adjustable speed limiting system for use with a vehicle propelled by a motor having a power adjusting member, said vehicle having a speedometer cable, comprising a generator driven from the speedometer cable for generating a voltage substantially proportionate to the speed of the vehicle, electro-magnetic relay operable by the generator for actuating a second electro-magnetic relay when the voltage output of the generator reaches or exceeds a predetermined value and for de-actuating said second electro-magnetic relay when said voltage output falls below said predetermined value, variable resistance means for varying the power supply from the generator to said first named electro-magnetic relay to provide for actuation of said first electro-magnetic relay at any predetermined vehicle speed, a normally open circuit including a solenoid and a source of energy independent of the voltage output of the generator, said second electro-magnetic relay completing said circuit upon its actuation by said first electro-magnetic relay to thereby energize said solenoid by said independent source of energy, a second circuit including said independent source of energy and a second solenoid, open while said first named circuit is closed, means operable by the generator for completing said second circuit simultaneously with the de-actuation of said second electro-magnetic relay when the voltage output of the generator falls below said predetermined value, to thereby energize said second solenoid by said independent source of energy, resilient means tending to hold the power adjusting member of the vehicle in maximum power position, an element actuating the power adjusting member for moving it in power increasing or decreasing positions, a worm gear and a curtailing member associated therewith for curtailing the power increasing scope of movement of the power adjusting member, pivotally mounted on said actuating element for movement thereon in unison, an accelerator having a fulcrum pivotally mounted on the vehicle, a lever pivotally mounted on said actuating element, a link connecting said accelerator and lever, an element fixedly mounted on said actuating element lying in the paths of movement of said curtailing member and lever, resilient means tending to hold said accelerator in a minimum power position, said resilient means being stronger than said resilient means tending to hold the power adjusting member of the vehicle in a maximum power position, a worm engaging said worm gear, means operable by said first solenoid when energized for turning said worm in a direction to cause said curtailing member to move in a power reducing direction, like means operable by said second solenoid when energized for turning said worm in a direction to cause said curtailing member to move in a power increasing direction, means operable by each said turning means for intermittently interrupting and restoring its turning action comprising a member opening and closing a circuit breaking means to de-energize and energize the first and second electric actuating means, respectively, means operable by said worm gear for de-energizing said first solenoid when said curtailing member reaches a position corresponding to minimum power adjustment, means operable by said worm gear for de-energizing said second solenoid when said curtailing member reaches a position corresponding to maximum power, and means operable by the depression of the accelerator for simultaneously de-energizing said first solenoid and energizing said second solenoid to temporarily cause said curtailing member to assume a position of maximum power.

11. Combination according to claim 10, wherein said first and second circuits each includes a time delay element.

12. A combination according to claim 10 wherein means are included for damping said means operable by said first solenoid when energized for turning said worm in a direction to cause said curtailing member to move in a power reducing direction, and also for damping said like means operable by said second solenoid when energized for turning said worm in a direction to cause said curtailing member to move in a power increasing direction.

13. A combination according to claim 10 wherein said means operable by the depression of the accelerator for simultaneously de-energizing said first solenoid and energizing said second solenoid to temporarily cause said curtailing member to assume a position of maximum power, includes a time delay element.

14. A combination according to claim 10 wherein the first and second solenoids are rotary type solenoids having a rotary, spring returned core.

15. A combination according to claim 10 wherein said worm engaging said worm gear is a worm having a shaft, and wherein said means operable by said first solenoid when energized for turning said worm in a direction to cause said curtailing member to move in a power reducing direction, and said like means operable by said second solenoid when energized for turning said worm in a direction to cause said curtailing member to move in a power increasing direction, each comprises ratchet means engaging and disengaging the associated ends of the core of the solenoid and of the worm shaft.

References Cited in the file of this patent

UNITED STATES PATENTS

| | | |
|---|---|---|
| 1,350,446 | Fynn | Aug. 24, 1920 |
| 2,243,354 | Musser | May 27, 1941 |
| 2,454,659 | Leonard | Nov. 23, 1948 |
| 2,469,779 | Nowalk | May 10, 1949 |